May 2, 1933.  G. D. BISHOP  1,906,518
FRUIT GUARD
Filed May 24, 1932   2 Sheets-Sheet 1
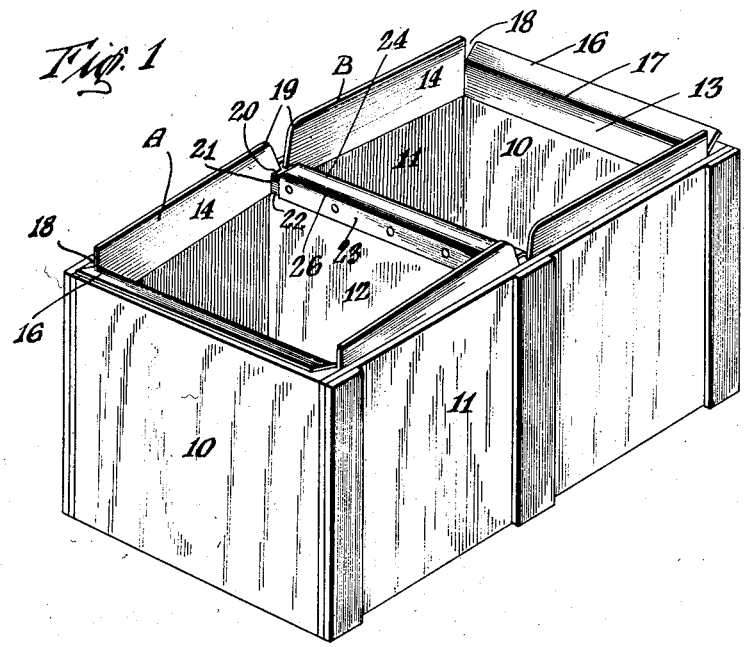
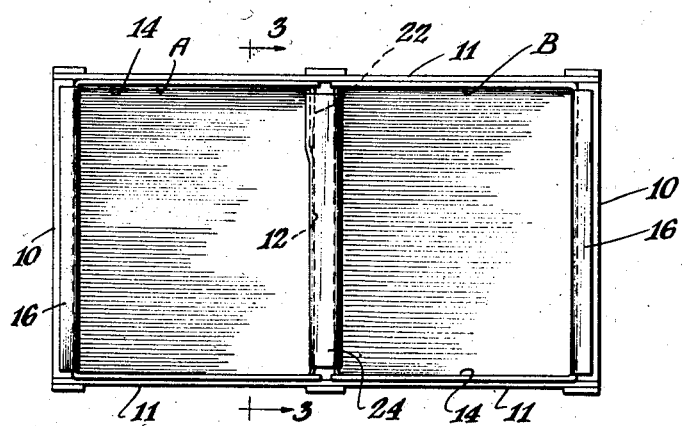
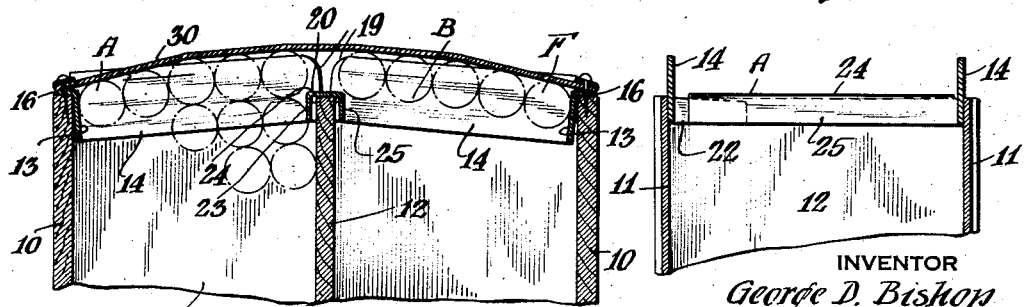
INVENTOR
George D. Bishop
BY
Austin & Dix
ATTORNEYS May 2, 1933.  G. D. BISHOP  1,906,518
FRUIT GUARD
Filed May 24, 1932  2 Sheets-Sheet 2
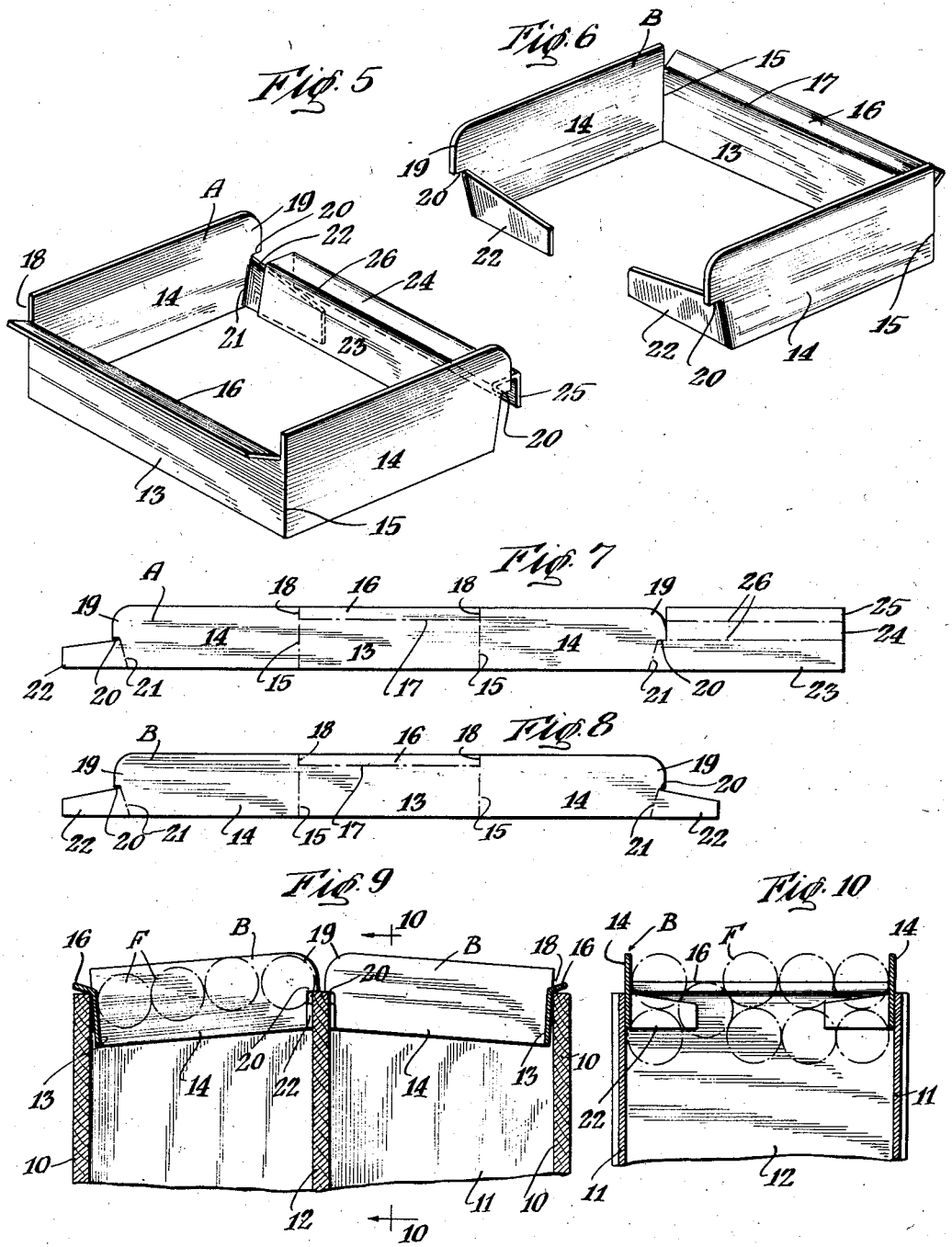

Patented May 2, 1933

1,906,518

UNITED STATES PATENT OFFICE

GEORGE D. BISHOP, OF SANFORD, FLORIDA, ASSIGNOR TO CROWN PAPER COMPANY, OF SANFORD, FLORIDA, A CORPORATION OF DELAWARE

FRUIT GUARD

Application filed May 24, 1932. Serial No. 613,196.

This invention relates to the packing of fruits and vegetables and more particularly to a fruit guard which shields and protects the top layer of fruit against injury during packing and shipping.

In packing citrus fruits, such as oranges and lemons, the top layer is commonly allowed to extend a substantial distance above the sides of the box or crate. When the cover slats are applied to the box, pressure is exerted thereon sufficient to force the ends of the slats down against the ends of the box, thereby pushing the fruit in the top layer downwardly, and causing the fruit adjacent the ends and sides of the box to slide against the inside of the box. This frequently results in bruising the skin of the fruit, which causes rapid decomposition of the top layer.

The fruit guard herein disclosed is an improvement over the fruit guard shown and disclosed in my prior Patent No. 1,799,497 and dated April 7, 1931. This invention comprehends means to prevent the ends of the fruit guard from sliding upwardly out of the box and thus leaving the fruit without protection. This is accomplished by providing tab portions extending from one or both ends of the fruit guard, which seat against the transverse wall of the box. The pressure of the fruit against the tabs holds the protective guard in position and prevents the same from getting out of adjustment. When only one end of the guard is provided with a tab portion, the other end thereof may be provided with a saddle portion which seats over the transverse wall of the box, and prevents the guard from getting out of adjustment, and in addition, protects the adjacent fruit from becoming injured through contact with the rough transverse wall.

A fruit guard may be used to surround the walls of each box compartment, and when so used, it is preferable to provide one of the guards with a saddle portion under which the tab portions of the fruit guard of the next compartment extend, both guards being held in place by the saddle portion.

It is an object of my invention to provide a guard of paperboard material adapted to be positioned in a packing and shipping box to prevent fruit packed therein from being injured, which guard is provided with means for holding the same in proper adjusted position.

Another object of my invention is to provide a fruit guard having means for holding the same in place within the packing box, said means comprising cooperating portions extending from each end of the guard.

Another object of my invention is to provide a pair of complementary fruit guards which are adapted to be positioned within adjacent compartments of a packing box, the guards being provided with means which mutually cooperate to hold the guards in proper adjusted position within the box.

Still another object of my invention is to provide a combination fruit guard and packing box, which fully protects the fruit against abrasion and injury during packing and during shipment.

Other objects of this invention will become apparent as the disclosure proceeds.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a perspective view of a packing box of two compartments, having a pair of complementary fruit guards applied thereto.

Fig. 2 is a top view of the packing box and fruit guard combination shown in Fig. 1.

Fig. 3 is a vertical transverse cross sectional view through the fruit guard and box combination shown in Figs. 1 and 2, this view being taken on line 3—3 of Fig. 2.

Fig. 4 is a vertical longitudinal cross sectional view through a two compartment box and associated fruit guards, the box being fully packed and covered with slats.

Fig. 5 is a perspective view of a fruit guard fully assembled.

Fig. 6 is a perspective view of another fruit guard fully assembled, which can be used independently or in combination with the fruit guard shown in Fig. 5.

Fig. 7 is a side view of the fruit guard shown in Fig. 5, as it appears when fully extended.

Fig. 8 is a side view of the fruit guard shown in Fig. 6, as it appears when fully extended.

Fig. 9 is a vertical longitudinal cross sectional view through a two compartment box with the fruit guard shown in Fig. 6 positioned in each of the compartments; and Fig. 10 is a vertical transverse cross sectional view through the box and associated fruit guard, this view being taken on line 10—10 of Fig. 9.

Like reference characters denote like parts in the several figures of the drawings.

Referring more particularly to Fig. 1 of the drawings, there is shown a two compartment box comprising end walls 10, side walls 11, and a transverse center wall 12. A fruit guard A is shown seated within and extending around the walls of one compartment, and a fruit guard B of slightly modified form is shown extending around the walls of the other compartment. Each of the fruit guards A and B comprise an end portion 13, which seats along the inside face of the end wall 10 of the box, and side wall portions 14, which seat along the side walls of the box and are separated from the end wall portion 13 by score lines 15. The end wall 13 is provided with a lip 16, separated from the end wall portion 13 by the score line 17 and from the side wall portions 14 by the cuts 18. The lip portion 16 is adapted to be bent back to rest against the top edge of the end wall 10 of the box, as shown more particularly in Figs. 1 and 4. The side wall portions 14 of the guard extend above the top edge of the side walls of the box to protect the top row of fruit packed therein. Each of the guards A and B are provided with a shoulder portion 19, the lower edge 20 of which seats on top of the transverse center wall 12 of the box. The lip portion 16 and the shoulder portions 19 prevent the guard from falling into the box compartment.

During shipment and handling, it has been found that the fruit guard often works itself up out of the crate so that the fruit becomes damaged by striking the sides and ends of the packing box. To prevent this from occurring I have provided each of the side wall portions 14 of the guard B with an inwardly extending tab portion 22, separated from the side wall portions 14 by a score line 21. The tab portions 22 are so arranged as to seat against the inside face of the transverse center wall of the box. When the box has been fully packed with fruit, the individual pieces of fruit rest against the tab portions 22 and press the same against the transverse center wall of the box, thus preventing the free ends of the side wall portions 14 from moving out of position. If found desirable, glue or a small nail may also be used to secure the tab portion 22 to the transverse side wall 12.

The fruit guard A is provided with a saddle portion which seats over the transverse center wall of the box. The saddle portion comprises a side part 23, which extends from the free end of one of the side wall portions 14 of the guard, and is adapted to rest against the inside face of the transverse side wall 12. A top part 24, separated from the side part 23 by the score line 26, extends over the top edge of the transverse center wall, and an edge part 25, separated from the top part 24 by the score line 26, hangs over the other side of the transverse wall, as clearly shown in Figs. 1 and 2. The saddle portion may be secured to the transverse partition by glue or tacks, or the pressure of the adjacent fruit thereagainst may be relied upon to hold the same in position. The other side wall portion 14 of the guard A is provided with a tab portion 22 which extends laterally therefrom. When the fruit guard A is positioned in a box compartment, it is preferable to insert the tab portion 22 under the top wall 24 of the saddle portion, thus holding both side wall portions 14 in position by merely securing the saddle in place.

The fruit guards A and B can be advantageously used as complementary members, one cooperating with the other to hold the same in place. In such event, fruit guard B is first positioned in one of the box compartments with the tab portions 22 extending along the inside face of the transverse center wall of the box. The other fruit guard A is then inserted into the other compartment with the saddle portion thereof seated over the transverse center wall 12, with the tab portions 22 of the fruit guard B extending into the saddle portion of the fruit guard A, as shown in Figs. 2 and 4. The fruit which rests against the saddle portion of the guard A holds both guards A and B in proper adjusted position.

If desired, however, the fruit guard B may be used in both compartments of the box, or, again, the fruit guard A may be used in both compartments. Thus it is seen that the fruit guards A and B may be used in conjunction or interchangeably, as desired.

The fruit guards A and B herein disclosed are preferably made of fairly tough and strong paperboard or fibreboard material. Both guards can be economically made by running the material through a cutting and scoring machine. The guards prevent the top layer of fruit from being bruised or damaged by the force exerted in applying the cover slats 30 to the box. The top layer of the fruit is also protected by the side portions 14 of the guard from exposure and injury during transit. All edges of the box and its compartments are covered by the fruit guard so that the fruit cannot become bruised thereagainst. Both the guards A and B can be quickly and easily applied to the box. Normally, the pressure of the individual pieces of fruit will hold the guards in position. If this is not sufficient, however, a strip of glue or a tack may be used to hold the same.

It is understood that the fruit guard and packing box combination herein disclosed may be used in connection with the packing of many different kinds of fruits and vegetables and other materials which are liable to become injured during packing and transit. The term "fruit guard" as used in the specification and claims should therefore be so interpreted.

While certain novel features of the invention have been disclosed and are pointed out in the annexed claims, it will be understood that various omissions, substitutions and changes may be made by those skilled in the art without departing from the spirit of the invention.

What is claimed is:

1. A fruit guard comprising a band of paperboard having a side wall portion adapted to engage a side wall of the box, a shoulder portion at one end of said side wall portion adapted to engage an adjacent wall of the box, and a tab portion positioned below said shoulder and extending along said adjacent wall and holding said guard in position.

2. A fruit guard comprising a band of paperboard having a side wall portion adapted to engage a side wall of the box, a shoulder portion at one end of said side wall portion adapted to rest upon an adjacent wall of the box, and a saddle portion extending laterally from said side wall portion adapted to seat over said adjacent wall and hold said guard in position.

3. A fruit guard comprising a band of paperboard having an end wall portion and a side wall portion adapted to engage an end and side wall of a box, a shoulder portion at one end of said side wall portion adapted to rest upon an adjacent wall of the box, and a tab portion extending laterally along said adjacent wall and holding said guard in position.

4. A fruit guard comprising a band of paperboard having an end wall portion and a pair of side wall portions adapted to engage an end wall and the adjacent side walls of a box, and a saddle portion extending laterally from the end of one of said side wall portions adapted to seat over the adjacent end wall of the box and hold said guard in position.

5. A fruit guard comprising a band of paperboard having an end wall portion and a pair of side wall portions adapted to engage an end wall and the adjacent side walls of a box, and a saddle portion extending laterally from the free end of one of said side wall portions adapted to seat over the adjacent end wall of the box and hold said guard in position.

6. A fruit guard comprising a band of paperboard having an end wall portion and a pair of side wall portions adapted to engage an end wall and the adjacent side walls of a box, a saddle portion laterally extending from the free end of one side wall portion adapted to seat over the adjacent end wall of the box, and a tab portion extending laterally from the free end of the other side wall portion adapted to seat against said adjacent end wall.

7. A fruit guard comprising a band of paperboard having an end wall portion and a pair of side wall portions adapted to engage an end wall and the adjacent side walls of a box, a saddle portion extending from the free end of one side wall portion adapted to seat over the adjacent end wall of the box, and a tab portion extending from the free end of the other side wall portion projecting under said saddle portion and seated against said adjacent wall.

8. A fruit box having side and end walls and a transverse center wall in combination with a guard mounted within said box adjacent the top row of fruit, said guard comprising a band of paperboard having an end wall portion and a pair of side wall portions extending along an end wall and the side walls of the box, and a tab portion extending laterally from the free end of each side wall portion and seated against the transverse center wall to hold the guard in position.

9. A fruit box having side and end walls and a transverse center wall in combination with a guard mounted within said box adjacent the top row of fruit, said guard comprising a band of paperboard having an end wall portion and a pair of side wall portions extending along an end wall and the side walls of the box, and a saddle portion extending laterally from the free end of one of said side wall portions seated over the transverse center wall of the box to hold said guard in position.

10. A fruit box having side and end walls and a transverse center wall in combination with a guard mounted within said box adjacent the top row of fruit, said guard comprising a band of paperboard having an end wall portion and a pair of side wall portions extending along an end wall and the side walls of the box, a saddle portion extending from the free end of one of said side wall portions seated over the transverse center wall, and a tab portion extending from the free end of the other side wall projecting under said saddle portion.

11. In combination with adjacent box compartments, a fruit guard extending around the side walls and an end wall of one compartment, and a complementary fruit guard extending around one end wall and the side walls of the adjacent compartment, one of said guards having a saddle portion seated over the box wall separating said compartments and the other guard having tab portions extending under said saddle portion.

12. In combination with adjacent box compartments, a fruit guard extending around the side walls and an end wall of one compartment, and a complementary fruit guard extending around one end wall and the side walls of the adjacent compartment, one of said guards having a saddle portion extending from one end thereof and a tab portion extending from the other end thereof, the other guard having a tab portion extending from each end thereof, said saddle portion being seated over the box wall separating said compartments, said tab portions projecting into the ends of said saddle portion.

In testimony whereof I have hereunto set my hand.

GEORGE D. BISHOP.